United States Patent
Allarey et al.

(10) Patent No.: US 8,032,772 B2
(45) Date of Patent: Oct. 4, 2011

(54) METHOD, APPARATUS, AND SYSTEM FOR OPTIMIZING FREQUENCY AND PERFORMANCE IN A MULTI-DIE MICROPROCESSOR

(75) Inventors: Jose P Allarey, Davis, CA (US); Varghese George, Folsom, CA (US); Sanjeev Jahagirdar, Folsom, CA (US); Oren Lamdan, Kiryat Tivon (IL); Ofer J Nathan, Kiryat Tivon (IL); Tomer Ziv, Rishon Lezion (IL)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 11/940,958

(22) Filed: Nov. 15, 2007

(65) Prior Publication Data

US 2009/0132844 A1 May 21, 2009

(51) Int. Cl.
G06F 1/00 (2006.01)
G06F 1/32 (2006.01)
(52) U.S. Cl. .................. 713/322; 713/340; 713/320
(58) Field of Classification Search .................. 713/300, 713/340
See application file for complete search history.

(56) References Cited

U.S. PATENT DOCUMENTS

| 7,249,268 | B2 * | 7/2007 | Bhandarkar | 713/320 |
| 7,502,948 | B2 * | 3/2009 | Rotem et al. | 713/300 |
| 7,650,518 | B2 * | 1/2010 | Allarey et al. | 713/300 |
| 2005/0289365 | A1 * | 12/2005 | Bhandarkar | 713/300 |
| 2006/0026447 | A1 * | 2/2006 | Naveh et al. | 713/322 |
| 2006/0053326 | A1 * | 3/2006 | Naveh et al. | 713/323 |
| 2006/0149975 | A1 * | 7/2006 | Rotem et al. | 713/300 |
| 2007/0033425 | A1 * | 2/2007 | Clark | 713/320 |
| 2007/0083779 | A1 | 4/2007 | Misaka et al. | |

FOREIGN PATENT DOCUMENTS

| JP | 09-026900 | 1/1997 |
| JP | 2001-202155 | 7/2001 |
| JP | 2007-102673 | 4/2007 |

OTHER PUBLICATIONS

State Intellectual Property Office, P.R. China, First Office Action issued Jul. 5, 2010 in Chinese patent application No. 200810182271.8.
Japanese Patent Office, Notice of Reasons for Rejection mailed Oct. 12, 2010 in Japanese patent application No. 2008-290587.

* cited by examiner

*Primary Examiner* — Suresh Suryawanshi
(74) *Attorney, Agent, or Firm* — Trop, Pruner & Hu, P.C.

(57) ABSTRACT

With the progress toward multi-core processors, each core is can not readily ascertain the status of the other dies with respect to an idle or active status. A proposal for utilizing an interface to transmit core status among multiple cores in a multi-die microprocessor is discussed. Consequently, this facilitates thermal management by allowing an optimal setting for setting performance and frequency based on utilizing each core status.

23 Claims, 7 Drawing Sheets

METHOD, APPARATUS, AND SYSTEM FOR OPTIMIZING FREQUENCY AND PERFORMANCE IN A MULTI-DIE MICROPROCESSOR

BACKGROUND

Embodiments of the present invention relate to thermal management of microprocessors and more specifically to optimize frequency and performance in a multi-die microprocessor via a serial link replicating states across the multiple dies.

In a multi-core microprocessor, it may be desirable to allow the cores to use available power headroom to maximize performance. In such instances, the cores may operate at frequencies and/or voltages above those specified by the manufacturer. Thermal throttling may then be used to reduce the operating frequency and/or voltage of the cores when a target temperature is reached or exceeded.

However, thermal throttling may not occur in some environments, such as where the ambient temperature is sufficiently low. In such an environment, there is no mechanism available to reduce the operating frequency and/or voltage, and the processor will be permitted to run at a frequency/voltage greater than specified by the manufacturer for an indefinite amount of time. In this case, the power delivery system must be over-designed in order to supply the additional power required for the system.

With the progress toward multi-die processors, each die can not readily ascertain the status of the other dies with respect to an idle or active status. Consequently, this precludes setting an optimal frequency and performance for the multi-die processor. One inefficient solution is routing dedicated signal lines to transmit and receive core power status. Unfortunately, the cost of this solution is directly proportional to the number of cores as well as the number of core power states.

BRIEF DESCRIPTION OF THE DRAWINGS

A better understanding of the present invention can be obtained from the following detailed description in conjunction with the following drawings, in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern the use of a dedicated interface to transmit core status among multiple cores in a multi-die microprocessor. Although the following discussion centers on dual core and quad core processor implementations, it will be understood by those skilled in the art that the present invention as hereinafter claimed may be practiced in support of a multi-core processor having a different number of cores as well and any integrated chip, such as, a microcontroller, application specific integrated chip (ASIC), etc. that has multiple processing elements or logic elements.

The present application is related to and may incorporate embodiments from a previously filed application. The application is titled "A Method, Apparatus, and System for Increasing Single Core Performance in a Multi-core Microprocessor", Ser. No. 11/477,751.

As used herein, "single core turbo mode" is an operational mode of a multi-core microprocessor. When a multi-core microprocessor is in single core turbo mode, the multi-core processor may operate at a higher operating point, and thus, at least one core may run at a higher operational frequency and/or voltage only as long as at least one core remains idle. Thus, in single core turbo mode, the power and thermal headroom of one or more idle cores may be used to increase the operational frequency of one or more cores that are not idle.

Figure 1:
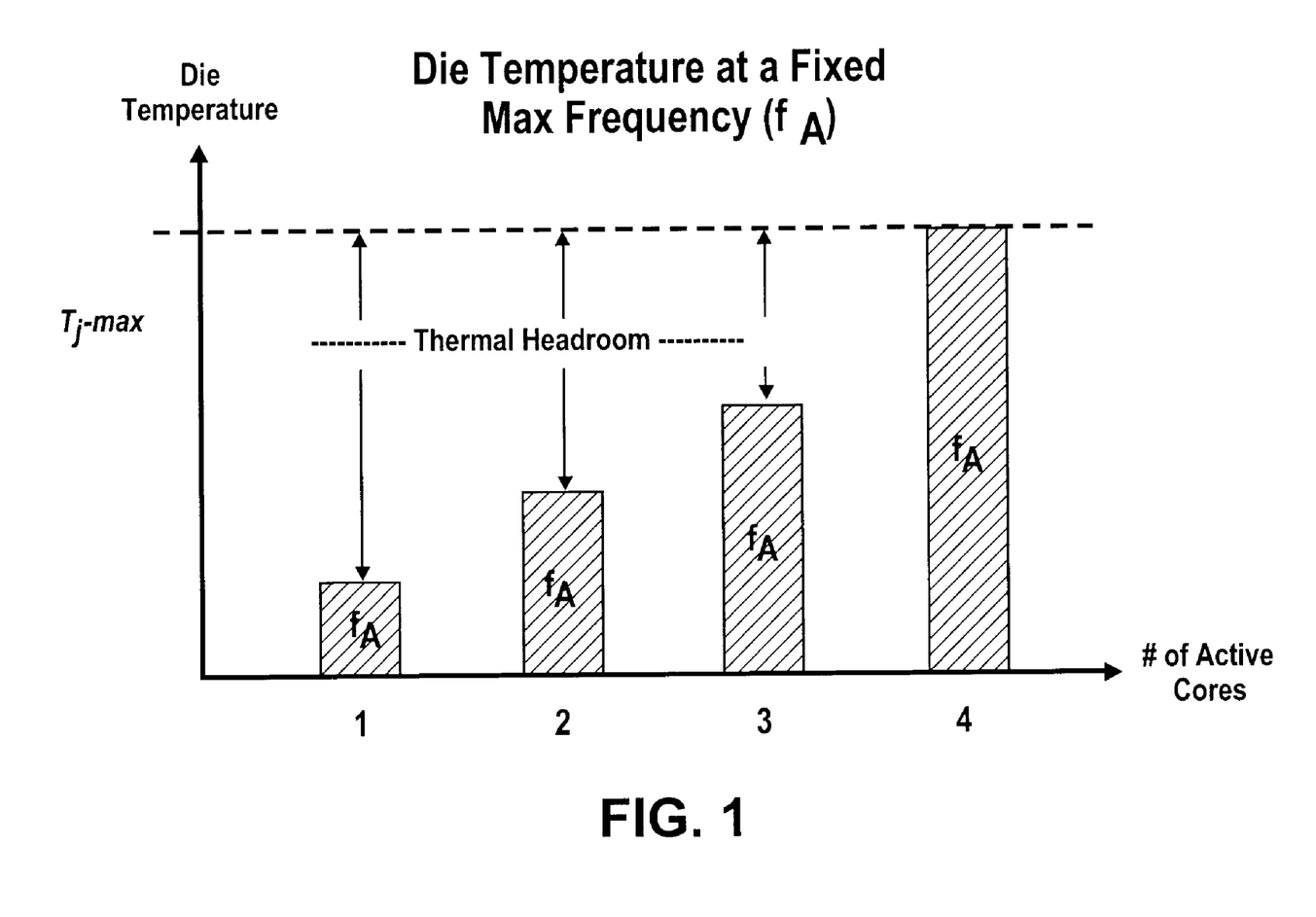
FIG. 1 is a graph according to some embodiments.

FIG. 1 is a graph according to some embodiments. The graph has a dashed horizontal line that depicts the maximum die temperature allowed, a y axis depicting a die temperature, and an x axis depicting a number of cores that have an active status. In this particular embodiment, the processor cores at operating at a fixed maximum frequency, fa. An active status indicates the core is processing an operation, hence, it is not idle. Typically, as the number of active cores on a processor increases, so does the range of power consumed.

The graph depicts the amount of thermal headroom decreases as the number of active cores increases. Conversely, the amount of thermal headroom increases as the number of active cores decreases. For the example of one, two, and three active cores, there is allowable thermal headroom that is not utilized.

Figure 2:
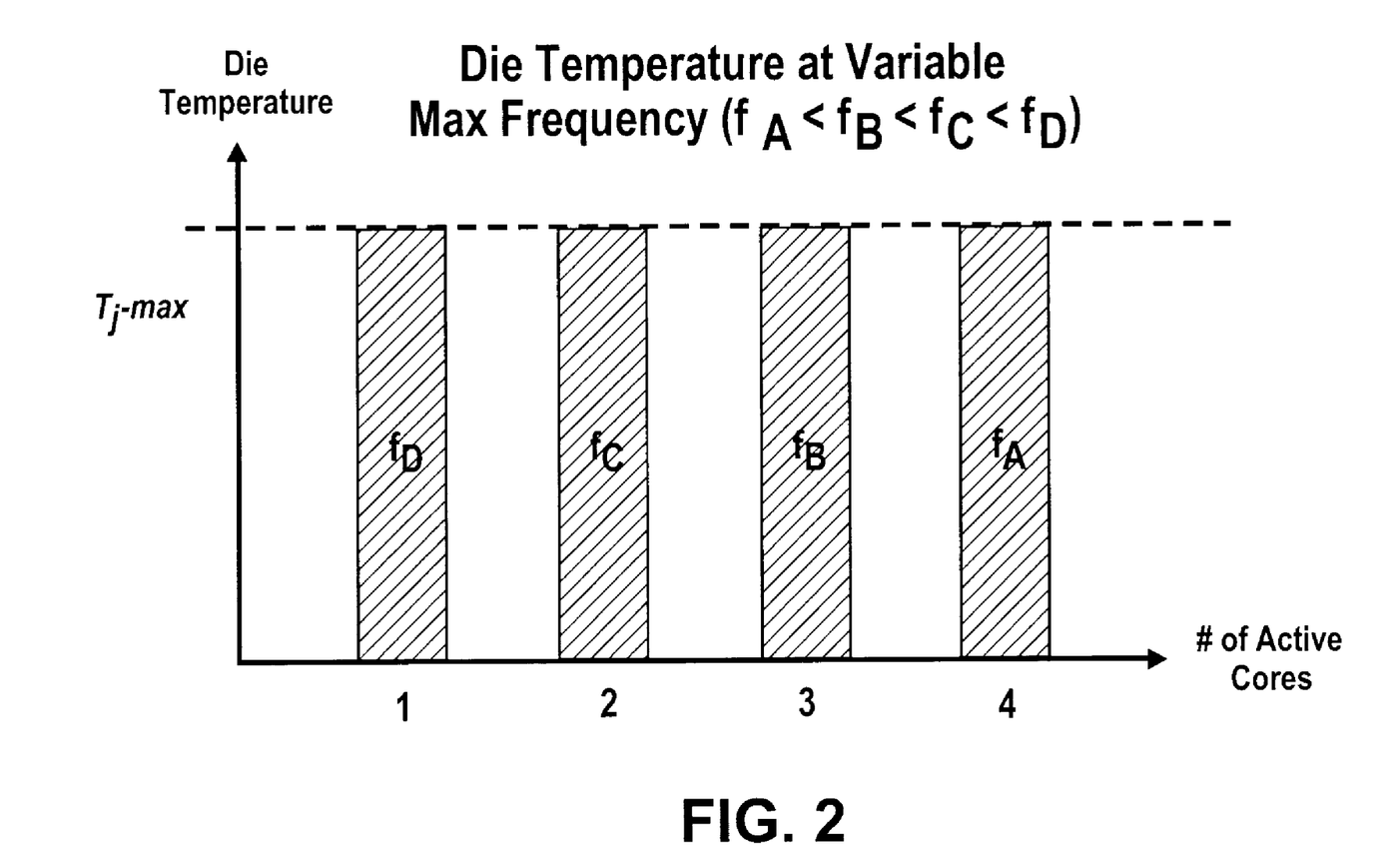
FIG. 2 is a graph according to some embodiments.

FIG. 2 is a graph according to some embodiments. The graph has a dashed horizontal line that depicts the maximum die temperature allowed, a y axis depicting a die temperature, and an x axis depicting a number of cores that have an active status. In this particular embodiment, the processor cores at operating at different frequencies based at least in part on the number of active cores such that fa<fb<fc<fd. For example, the frequency is decreased as the number of active cores is increased. Obviously, this allows increased performance since this graph differs from FIG. 1 because of the lack of thermal headroom.

An active status indicates the core is processing an operation, hence, it is not idle. Typically, as the number of active cores on a processor increases, so does the range of power consumed.

The graph depicts the amount of thermal headroom decreases as the number of active cores increases. Conversely, the amount of thermal headroom increases as the number of active cores decreases.

As previously discussed, with the progress toward multi-die processors, each die can not readily ascertain the status of the other dies with respect to an idle or active status. Consequently, this precludes setting an optimal frequency and performance for the multi-die processor. One inefficient solution is routing dedicated signal lines to transmit and receive core power status. Unfortunately, the cost of this solution is directly proportional to the number of cores as well as the number of core power states.

Figure 3:
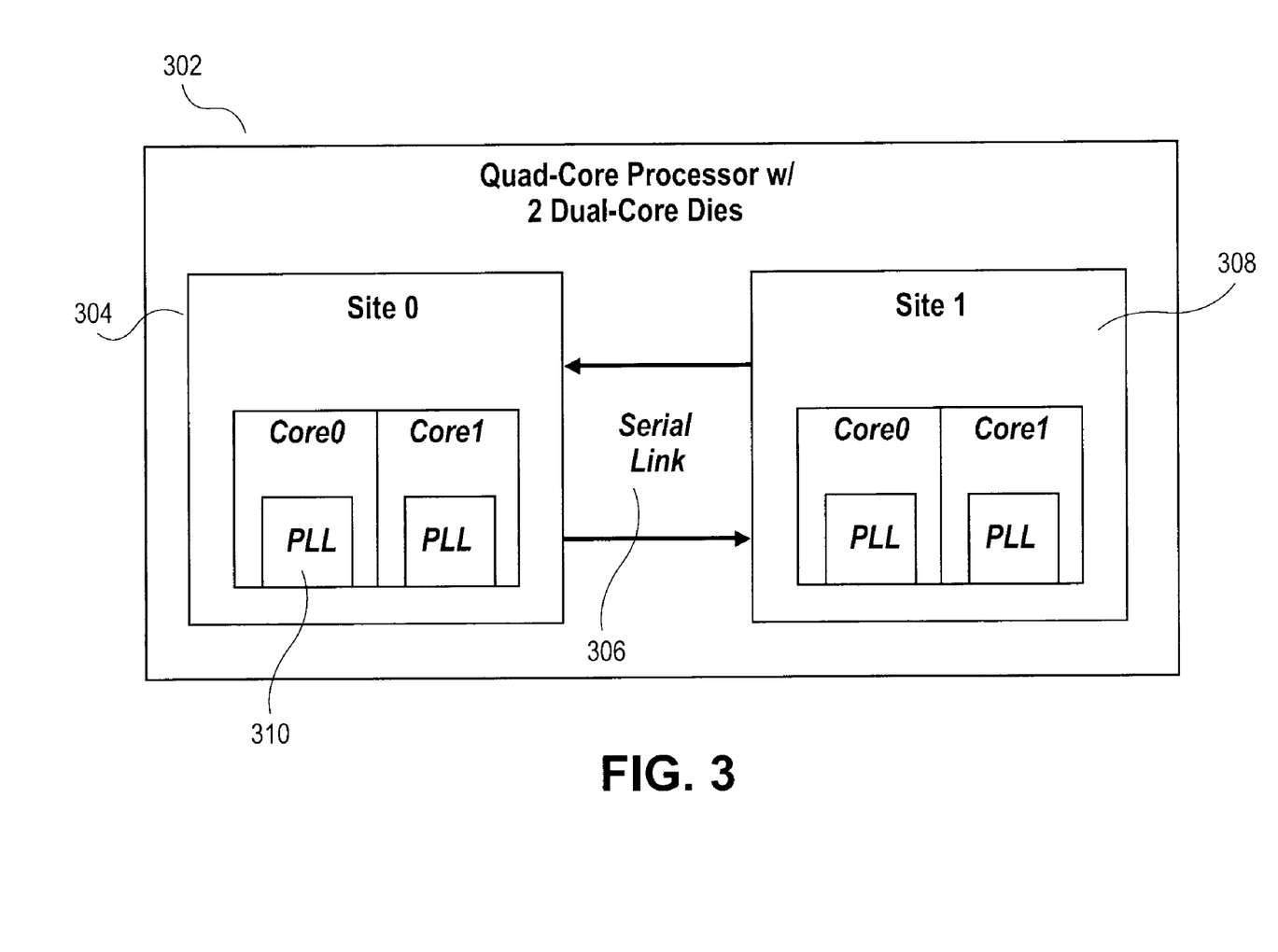
FIG. 3 is an illustration of an apparatus according to some embodiments.

Embodiments of the present invention concern the use of a dedicated interface to transmit core status among multiple cores in a multi-die microprocessor. Several following embodiments discuss a multi-core processor with a dedicated interface to transmit core status among multiple cores in a multi-die microprocessor FIG. 3 is an illustration of an apparatus according to some embodiments. In this embodiment, a quad core processor 102 with two dual-core dies 104 and 108 is portrayed. A dedicated serial link interface 106 allows the two dual core dies, or sites, 104 and 108 to communicate their respective core power status to facilitate a setting of an optimal frequency between the two dual-core dies. Furthermore, in one embodiment, the cores on each site are identical and have their own clock generators, PLLs (Phase Locked Loops). In this embodiment, it allows multi-core processors to optimize their maximum frequency even when the cores are on separate dies.

Figure 4:
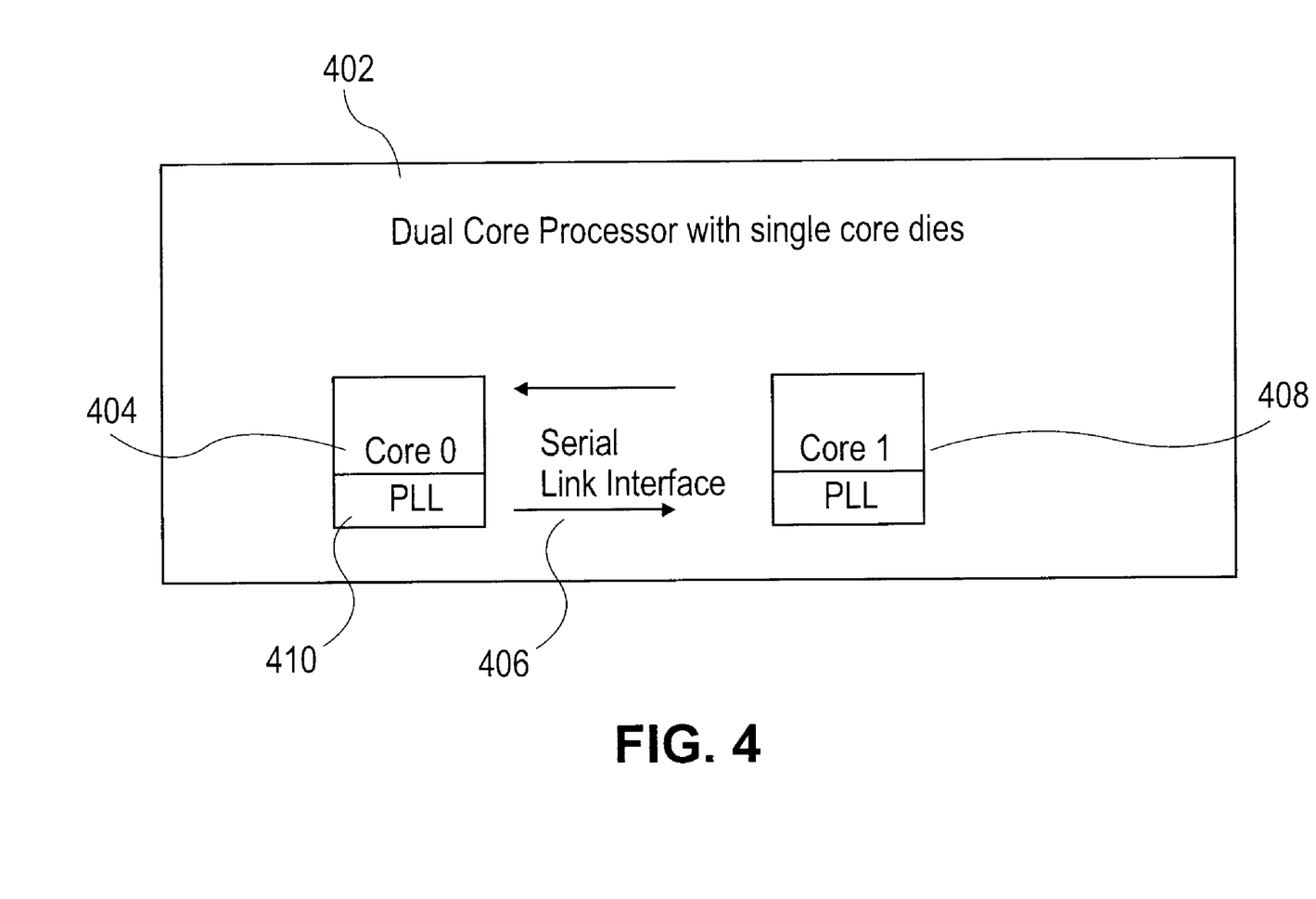
FIG. 4 is an illustration of an apparatus according to some embodiments.

FIG. 4 is an illustration of an apparatus according to some embodiments. In this embodiment, a dual core processor 402 with single core dies 404 and 408 is portrayed. A dedicated serial link interface 406 allows the dies to communicate their respective core power status to facilitate a setting of an optimal frequency between the two dies. Furthermore, in one embodiment, the cores on each site are identical and have their own clock generators, PLLs (Phase Locked Loops). In this embodiment, it allows multi-core processors to optimize their maximum frequency even when the cores are on separate dies.

Figure 5:
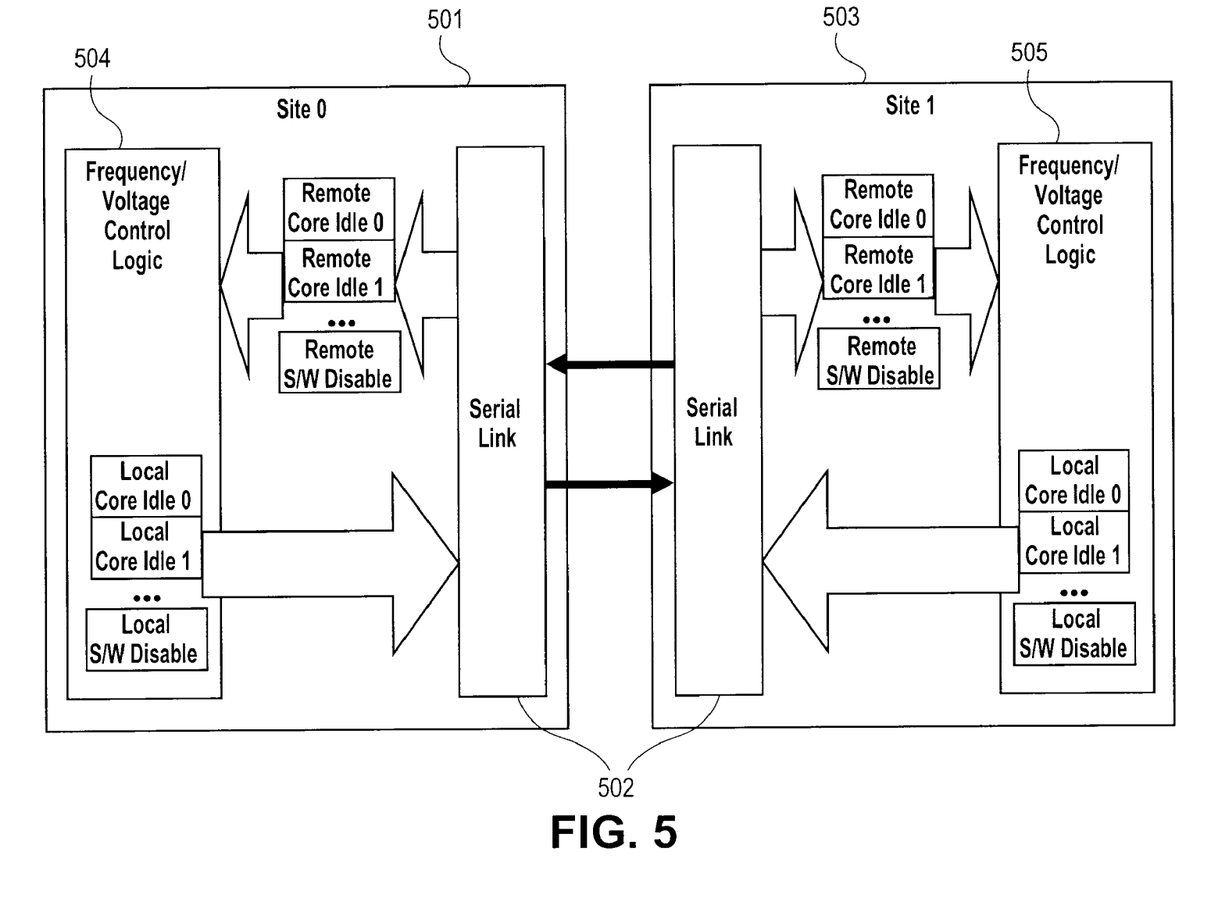
FIG. 5 is an illustration of an apparatus according to some embodiments.

FIG. 5 is an illustration of an apparatus according to some embodiments. In this embodiment, sites 501 and 503 communicate via an interface 502. In one embodiment, the interface 502 is a serial interface. In another embodiment, the serial interface is a two wire interface, one wire for transmitting and one wire for receiving. In this embodiment, the serial interface converts a data packet containing local core power status and a turbo software mode status into a serial stream and transmits from one site to another site. The receiving site's frequency/voltage logic (504 or 505) then determines an operating frequency for both sites based at least in part on the local and remote core power status and the turbo software mode status. In one embodiment, the frequency/voltage logic utilizes an algorithm as depicted in connection with FIG. 7.

In one embodiment, the frequency voltage logic resides in each site of the multi-site processor. In another embodiment, the frequency voltage logic resides in a chipset. In yet another embodiment, the frequency voltage logic resides in a power controller chip.

Figure 6:
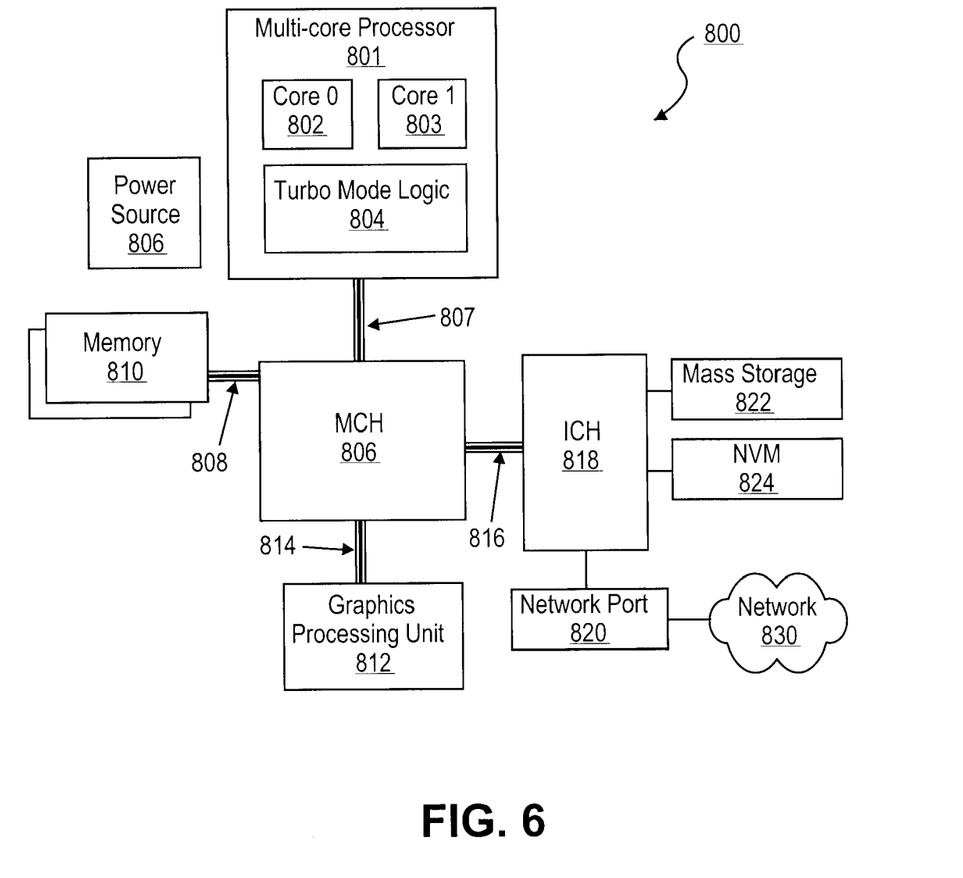
FIG. 6 is an illustration of a system according to some embodiments.

FIG. 6 illustrates a system block diagram according to some embodiments. The system (800) includes at least a multi-core processor or CPU (801), memory controller device (806), I/O controller device (818), and one or more memory devices (810). Note that in some embodiments, the memory controller device and/or the I/O controller device may be integrated into the CPU/processor (801).

The multi-core processor (801) includes at least two cores, Core 0 (802) and Core 1 (803). In some embodiments, the processor (801) may include additional cores. In embodiments including more than two cores, only one core may be allowed to operate in turbo mode while at least one core is idle, or, multiple cores may be allowed to operate in turbo mode while multiple cores remain idle.

The processor (801) also includes turbo mode logic (804), as described above in conjunction with the cross referenced application, to allow at least one core of the processor to operate at a higher than guaranteed frequency while at least one core of the processor is idle. Thus, available power and thermal headroom may be used by one core to increase or maximize the overall performance of the system when another core is idle.

The system may also include a network port or interface (820), and may be capable of being coupled to a wired or wireless network (830). The memory controller device (806) is coupled to the CPU (801) by a bus (807). The memory controller device (806) provides the CPU (801) with access to one or more memory devices (810), to which the memory controller device (806) is coupled by a memory bus (808).

A graphics processing unit (812) may be coupled to the memory controller device via a bus (814). An I/O controller device (818) may be coupled to the memory controller device (806) by a bus (816). The I/O controller device (818) may be coupled to a network port (820), capable of connecting to a network (830). The I/O controller device (818) may also be coupled to a mass storage device (822) and/or non-volatile memory (824). A battery or other power supply (806) may provide power to the system.

Together, these components form a system (800) that is capable of supporting the execution of machine readable instructions by CPU (801), and the storage of data, including instructions, within memory devices (810).

Figure 7:
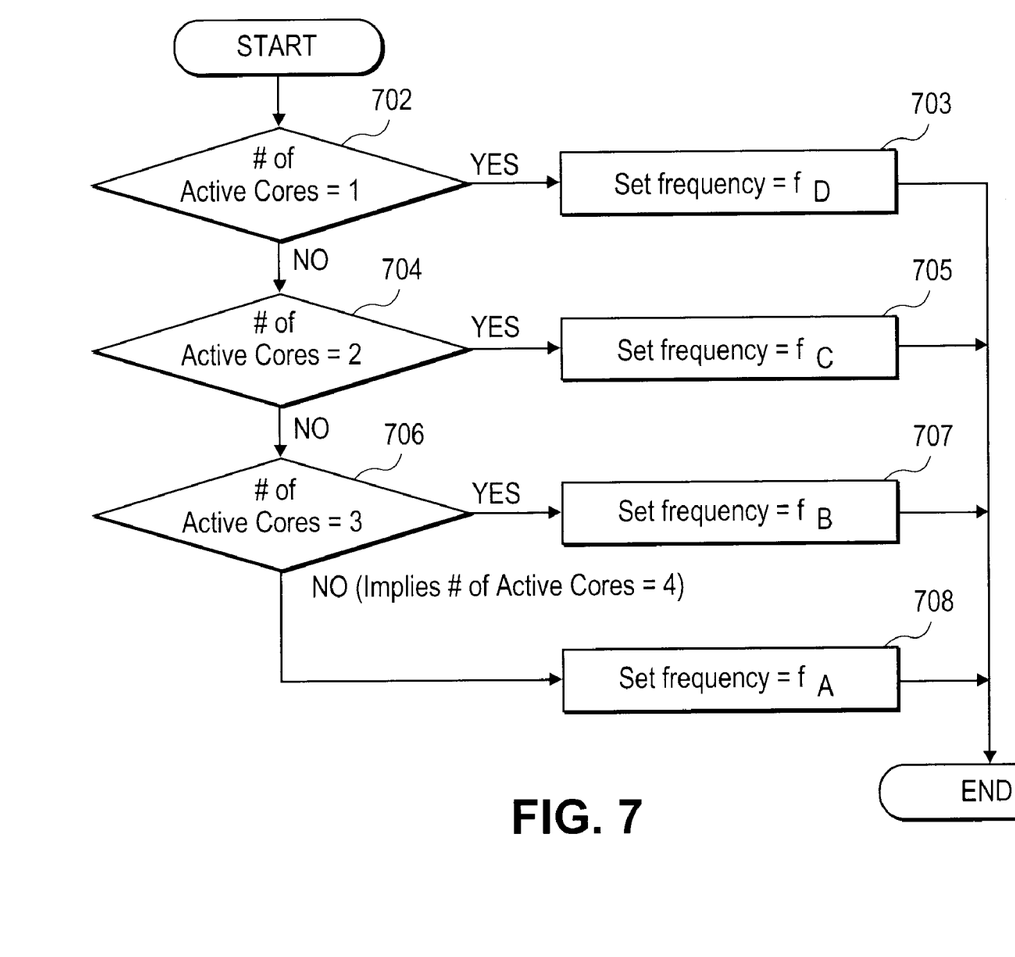
FIG. 7 is a method for a flowchart according to some embodiments.

FIG. 7 is a method for a flowchart according to some embodiments. In this embodiment, the method depicts a frequency selection for a two site processor, each site with two cores. However, the claimed subject matter is not limited to this embodiment. As depicted in FIG. 4, each site may have only one core. Furthermore, each site may utilize any number of cores depending on the application or other factors.

In this embodiment, the amount of active cores is determined by the local core power status and the remote core power status received via the interface. In the first decision block, 702, the frequency selected for all the cores is fd (block 703) if the number of active cores is one. Otherwise, the second decision block, 704 is analyzed. The frequency selected for all the cores is fc (block 705) if the number of active cores is two. Otherwise, the decision block, 706, is analyzed. The frequency selected for all the cores is fb (block 707) if the number of active cores is three. Otherwise, the frequency selected for all the cores is fa (block 708) if the number of active cores is four. In this embodiment, frequency fd is higher than fc, frequency fc is higher than fb, and frequency fb is higher than fa.

Thus, a method, apparatus, and system for optimizing frequency and performance in a multi-die Microprocessor are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A processor with a first site and a second site comprising:
   a dedicated serial link interface to transmit and receive a power status and a turbo software mode status of each respective core on the first site and second site; and
   a frequency selection logic in the first site, coupled to the dedicated serial link interface, to receive the power status of each respective core from the second site, to determine an operating frequency of each core on the first site and second site based at least in part on the power status and the turbo software mode status of each core of the first site and second site.

2. The processor of claim 1 wherein each site has a single processor core.

3. The processor of claim 1 wherein each site has two processor cores.

4. The processor of claim 1 further comprising a memory on each site to store the power status of each core.

5. The processor of claim 1 wherein the dedicated serial link interface is a two wire interface.

6. The processor of claim 5 wherein the two wire interface has a first wire to transmit and a second wire to receive a serial stream including data of the core power status.

7. The processor of claim 6 wherein the two wire interface is to utilize a data packet that is converted into the serial stream.

8. An apparatus comprising:
first and second cores on a first die;
third and fourth cores on a second die;
a dedicated serial link interface to couple the first die and the second die and to communicate a power status and a turbo software mode status of the first, second, third and fourth cores, wherein the dedicated serial link interface is a two wire interface having a first wire to transmit and a second wire to receive a serial stream of data of the power status and the turbo software mode status, wherein the two wire interface is to utilize a data packet that is converted into the serial stream; and
a frequency selection logic of the first core to determine an operating frequency of the first, second, third and fourth cores based at least in part on the power status of and the turbo software mode status of the first, second, third and fourth cores, wherein a first frequency is selected for the first core if a number of active cores is one, a second frequency is selected for the first and second cores if the number of active cores is two, a third frequency is selected for the first, second and third cores if the number of active cores is three, and a fourth frequency is selected for all the cores if all the cores are active.

9. A system comprising:
a multi-site processor, each site with at least a core;
a dedicated serial link interface to transmit and receive a power status and a turbo software mode status of each respective core on the multi-site processor; and
a frequency selection logic in at least one site of the multi-site processor, coupled to the dedicated serial link interface, to receive the power status of each respective core from the other sites, to determine an operating frequency of each core on the multi-site processor based at least in part on the power status and the turbo software mode status of each core, wherein the frequency selection logic is to analyze a number of active cores from all sites of the multi-site processor, and select an operating frequency for all of the cores of the multi-site processor so that the multi-site processor is to operate at a maximum temperature without a thermal headroom, the maximum temperature to remain constant regardless of the number of active cores.

10. The system of claim 9 further comprising a memory on each site to store the power status of each core.

11. The system of claim 9 wherein the dedicated serial link interface is a two wire interface.

12. The system of claim 11 wherein the two wire interface has a first wire to transmit and a second wire to receive a serial stream including data of the core power status.

13. The processor of claim 1 wherein the dedicated serial link interface is to couple a first core of a first die on the first site with a second core of a second die on the second site.

14. The processor of claim 1 wherein at least one core is allowed to operate in a turbo mode when at least one other core is idle.

15. The processor of claim 14 wherein the at least one core is to operate at a frequency higher than a guaranteed frequency.

16. The apparatus of claim 8 wherein the first core is allowed to operate in a turbo mode when the second core is idle, and is to operate at a frequency higher than a guaranteed frequency.

17. The apparatus of claim 8 wherein the first frequency is greater than the second frequency, the second frequency is greater than the third frequency, and the third frequency is greater than the fourth frequency.

18. The processor of claim 1 further comprising first, second, third and fourth cores, wherein a first frequency is selected for the first core if a number of active cores is one, a second frequency is selected for the first and second cores if the number of active cores is two, a third frequency is selected for the first, second and third cores if the number of active cores is three, and a fourth frequency is selected for all the cores if all the cores are active.

19. The processor of claim 18 wherein the first frequency is greater than the second frequency, the second frequency is greater than the third frequency, and the third frequency is greater than the fourth frequency.

20. The processor of claim 1 wherein the frequency selection logic is to analyze a number of active cores from the first and second sites, and select the operating frequency for all of the cores of the first and second sites so that the processor is to operate at a maximum temperature without a thermal headroom, the maximum temperature to remain constant regardless of the number of active cores.

21. The system of claim 9 further comprising first, second, third and fourth cores, wherein a first frequency is selected for the first core if a number of active cores is one, a second frequency is selected for the first and second cores if the number of active cores is two, a third frequency is selected for the first, second and third cores if the number of active cores is three, and a fourth frequency is selected for the first, second, third and fourth cores if all the cores are active.

22. The system of claim 21 wherein the first frequency is greater than the second frequency, the second frequency is greater than the third frequency, and the third frequency is greater than the fourth frequency.

23. The apparatus of claim 8 wherein the frequency selection logic is to analyze a number of active cores, and select an operating frequency for all of the cores so that the apparatus is to operate at a maximum temperature without a thermal headroom, the maximum temperature to remain constant regardless of the number of active cores.

* * * * *